Sept. 25, 1951     J. B. BRENNAN     2,569,149
BIMETALLIC STRUCTURE
Filed Oct. 19, 1945
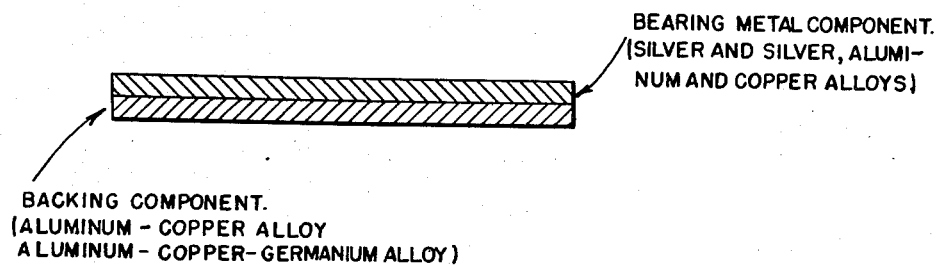
INVENTOR.
JOSEPH B. BRENNAN
BY
Oberlin & Limbach
ATTORNEYS.

Patented Sept. 25, 1951

2,569,149

UNITED STATES PATENT OFFICE 2,569,149

BIMETALLIC STRUCTURE

Joseph B. Brennan, Cleveland, Ohio

Application October 19, 1945, Serial No. 623,429

2 Claims. (Cl. 29—197)

This invention relates as indicated to composite metallic structures and particularly to bearings utilizing such structure.

The bearings used for example as the crankshaft bearings of internal combustion engines are generally a relatively thin bi-metallic shell which is supported by a bearing block or other auxiliary means. The bearing shell itself has the bearing face thereof formed of any of several commonly known bearing alloy compositions and the back or supporting component of the shell is strip steel. The steel backing component is used to provide a strong supporting structure for the bearing metal component which is generally structurally weak.

There have been two principal objections to this type of bearing. First, there has been a considerable problem in providing a satisfactory bond between the two components of the bearing shell. Secondly, the fact that the bearing shell is a separate unit, i. e. there is no atomic bond between it and the bearing block supporting the same, the rate of heat transfer away from the bearing surface has not been the most desirable.

It is a principal object of the present invention to provide a composite metallic structure which may be used as a bearing strip or shell and which avoids at least certain of these difficulties.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In the accompanying drawing the single figure illustrates the laminated bearing structure which constitutes the present invention.

Broadly stated this invention comprises the provision of a bi-metallic structure comprising a first non-ferrous metallic component and a second component which is an alloy of aluminum.

The first named component identified in the foregoing broad statement of the invention is that element which serves as the bearing surface, and the second named component is the one usually referred to as the backing or supporting component.

The first component

The first component, i. e. the non-ferrous metallic bearing surface portion of the bi-metallic structure, is a non-ferrous metal of the class consisting of silver, aluminum, copper, and alloys of the same.

When silver is used as the bearing surface component, it will generally be employed in substantially its pure state although minor amounts of elements such as nickel, copper, tin and cadmium may be alloyed therewith.

When aluminum is used as the bearing metal component, it will generally be found that an alloy of aluminum will produce best results as for example an alloy having the following approximate composition:

| | Per cent |
|---|---|
| Nickel | About 1 |
| Copper | About 1 |
| Tin | About 6 |
| Aluminum | About 92 |

When copper is employed as the bearing metal component, alloys of copper containing minor amounts of the elements such as nickel, lead or tin will be found best suited for at least certain types of service.

The second component

The second component, i. e. the backing element of the bi-metallic structure is preferably an alloy of aluminum and copper to which there may be optionally added a minor amount of germanium.

When the aluminum alloy contains only copper, then its composition should fall within the following ranges:

Aluminum from about 88% to about 98%
Copper from about 2% to about 12% together with such other alloying elements and impurities as are sometimes found in alloys of this character.

When, as previously indicated, a minor amount of germanium is added to the alloy, its total composition should preferably be within the following ranges:

Aluminum from about 86% to about 97.5%
Copper from about 2% to about 10%
Germanium from about 0.5% to about 2% together with such other alloying elements and impurities as are sometimes found in alloy compositions of this type.

Modes of manufacture

The bi-metallic element, the components of which have compositions lying within the ranges specified above, may be fabricated in a wide variety of ways. This great flexibility in the method of fabrication is due largely to the fact that aluminum alloys very readily with silver, and when silver is employed as the bearing material, a very effective bond between the two components is secured.

In the main, the bi-metallic elements of my invention may be fabricated by a process which is virtually a reversal of the processes employed in the prior art and wherein the softer low-melting point bearing metal is flowed onto or cast against the steel backing strip. In accordance with my invention, the aluminum alloy comprising the backing component may be pressure-cast against a silver shell as by utilizing conventional centrifugal casting procedures. It is also possible to fabricate this new metallic structure by preparing a laminated strip of the components in any desired manner and then by rolling the composite structure into thin sheets or strips, this making possible the production of elements to very close dimensions.

It is also possible to plate the soft bearing metal against the aluminum backing member.

Another method of preparing the bi-metallic structure is to first provide a separate cast element of the aluminum alloy and to then laminate the same with an electro-deposited strip of silver or copper, the two components being brought together under heat and pressure such as to effect an alloying of the silver and aluminum of the respective components. When the bearing component is of the aluminum alloy above identified, it may be cast against a strip of the aluminum-copper alloy backing member preferably under pressure, or against a shell of the aluminum-copper alloy backing member, and then the desired bearing may be fabricated by machining the cast product thus produced.

Another mode of preparing a composite metallic structure according to my invention is to cast the aluminum-copper alloy backing material against a strip or shell of copper or bronze when it is desired to use these materials as the bearing surfaces. The final bearing may then be produced by conventional machining processes.

It will be found that the pressure-casting operations above referred to may be carried out conveniently in accordance with the teachings of my Patent No. 2,371,604.

A bearing constructed in accordance with my invention is considerably lighter in weight than bearing elements employing a steel backing strip. They will also be found to possess a stronger bond between the two components. The aluminum-copper alloy backing member when formed of the composition above identified has a yield point in excess of 24,000 pounds per square inch, providing sufficient strength to properly support the structurally weaker bearing surface material.

Other modes of applying the principle of the invention may be employed, change being made as regards the details described, provided the features stated in any of the following claims or the equivalent of such be employed.

I, therefore, particularly point out and distinctly claim as my invention:

1. A bi-metallic structure comprising a first component of silver with minor amounts of nickel, copper, tin, and cadmium alloyed therewith, and a second component of the following composition:

Aluminum from about 88% to about 98%
   Copper from about 2% to about 12% together with such other alloying elements and impurities as are sometimes found in alloys of this character.

2. A bi-metallic structure comprising a first component of silver with minor amounts of nickel, copper, tin, and cadmium alloyed therewith, and a second component of the following composition:

Aluminum from about 86% to about 97.5%
   Copper from about 2% to about 12%
   Germanium from about 0.5% to about 2% together with such other alloying elements and impurities as are sometimes found in alloys of this character.

JOSEPH B. BRENNAN.

REFERENCES CITED

The following references are of record in the file of this patent:

UNITED STATES PATENTS

| Number | Name | Date |
| --- | --- | --- |
| 673,126 | Martin | Apr. 30, 1901 |
| 723,717 | Nicholson | Mar. 24, 1903 |
| 867,658 | Hoopes et al. | Oct. 8, 1907 |
| 909,924 | Monnot | Jan. 19, 1909 |
| 1,600,961 | Payne | Sept. 21, 1926 |
| 1,725,445 | Davignon | Aug. 20, 1929 |
| 1,805,448 | Frary | May 12, 1931 |
| 1,850,997 | Assman | Mar. 29, 1932 |
| 1,865,089 | Dix, Jr. | June 28, 1932 |
| 2,082,622 | Fink | June 1, 1937 |
| 2,145,460 | Ryder | Jan. 31, 1939 |
| 2,170,361 | Whitfield | Aug. 22, 1939 |
| 2,243,979 | Reynolds | June 3, 1941 |
| 2,277,023 | Steiner et al. | Mar. 17, 1942 |
| 2,352,346 | Schiff | June 27, 1944 |
| 2,376,779 | Kendall | May 22, 1945 |
| 2,431,947 | Martz | Dec. 2, 1947 |

OTHER REFERENCES

Metals Handbook, 1939 ed., p. 1222, pub. by Amer. Soc. for Metals, Cleveland, Ohio. (Copy in Div. 14.)